Уnited States Patent Office 3,471,432
Patented Oct. 7, 1969

3,471,432
POLYISOPRENE WITH BRANCHED-CHAIN MONOCARBOXYLIC ACID FOR IMPROVING PROCESSABILITY
Lambertus H. Krol and Adriaan W. van Breen, Delft, and Martijn H. de Jong, Rotterdam, Netherlands, assignors to Shell Oil Company, New York, N.Y., a corporation of Delaware
No Drawing. Filed Nov. 17, 1966, Ser. No. 595,035
Claims priority, application Netherlands, Dec. 28, 1965, 6516992
Int. Cl. C08c *11/38*
U.S. Cl. 260—31.2  3 Claims

ABSTRACT OF THE DISCLOSURE

The disclosure describes a composition having improved processability comprising a major proportion of high cis 1,4-polyisoprene and a minor proportion of at least one monocarboxylic acid containing 15–24 carbon atoms per molecule and having the general configuration

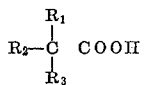

wherein $R_1$ and $R_2$ are hydrocarbyl radicals having 1–8 carbon atoms each and $R_3$ is a radical of the group consisting of hydrogen and hydrocarbyl radicals having 1–8 carbon atoms. The disclosure also describes a process for producing the improved polyisoprene, which process comprises admixing cis-1,4-polyisoprene with the above-described monocarboxylic acid, contacting the resultant mixture with steam and recovering the rubber composition.

---

This invention relates to a process for the preparation of a cis 1,4-polyisoprene containing rubber mixture, in which a solution of cis 1,4-polyisoprene in a hydrocarbon solvent which also contains an organic acid, is contacted with an aqueous medium at elevated temperature, whereupon an organic acid containing rubber mass is separated off. A somewhat related process is described in the literature. As organic acids use was made according to this related process of any straight chain acids which are normally solid. These fatty acids appeared to facilitate the coagulation of the rubber mass by means of the aqueous medium at elevated temperature, as well as the formation of a tack-free and solvent-free rubber crumb. If stearic acid was used, a stearic acid-containing rubber mixture was obtained which could be further processed in the rubber mixer with zinc oxide to form the conventional vulcanization activator zinc stearate.

The present invention has a different object, viz improvement of the processability of cis 1,4-polyisoprene and of the miscibility of this synthetic rubber with natural rubber and/or with other synthetic rubbers, and with the conventional rubber additives such as fillers, of which carbon black is a typical example. One drawback presented by this cis 1,4-polyisoprene is that it is hard to process. This poor processability manifests itself inter alia in that it is difficult, within a reasonable space of time, to compound homogeneous mixtures of cis 1,4-polyisoprene with other rubbers and, for example, carbon black, clay, calcium carbonate, etc. in conventional mixers, such as a Banbury-type mixer.

If attempts are made to improve the processability of the cis 1,4-polyisoprene by adding a rubber extending oil as plasticizer, the vulcanizate obtained from such an extended rubber shows a strong reduction in strength compared with the vulcanizate obtained from the non-extended—but poorly processable—rubber. Since it is precisely their high tensile strength, comparable to that of natural rubber vulcanizates, which makes cis 1,4-polyisoprene vulcanizates so attractive and an excellent substitute for natural rubber, this sacrifice of the strength properties for the sake of improved processability constitutes a serious drawback.

The use of naphthenic acids for improvement in the miscibility of synthetic rubbers with carbon black and other fillers has already been proposed. These acids are said to offer certain advantages over stearic acid. However, the use of these additives in cis 1,4-polyisoprene has the following disadvantage. The naphthenic acids available for use on a technical scale are compounds which are colored by bituminous impurities. One of the advantages of synthetic polyisoprene as compared with natural rubber is its high purity, constant quality and very light color; this is why cis 1,4-polyisoprene is so eminently suitable for those applications in which high purity (pharmaceutical applications) or light color (white sidewalls of tires) are of vital importance. It will be understood that these advantages are lost again by admixture of naphthenic acids. In addition, naphthenic acids derived from mineral oils promote the oxidative degradation of cis 1,4-polyisoprene, and this also constitutes a serious objection to the admixture of naphthenic acids with this rubber.

The use of stearic acid is found to present another type of difficulty: on important requirement for a suitable carboxylic acid used as a rubber additive is that the mixture of cis 1,4-polyisoprene and the carboxylic acid used is stable on storage. It now appears that in mixtures of polyisoprene and stearic acid, the latter shows a tendency to separate and then to crystallize with the result that such mixtures do not meet reasonable requirements of storage stability.

Consequently, there is a need for a cis-1,4-polyisoprene composition which, while fully retaining the strength properties of the vulcanizate, is readily processable and miscible with other rubbers and with rubber additives, is stable on storage and possesses the high purity and light color by reason of which the synthetic cis 1,4-polyisoprene compares so favorably with its natural counterpart.

The additive used to obtain such cis 1,4-polyisoprene compositions should further meet the requirement of being soluble in hydrocarbon solvents for the following reason: it has been found that cis 1,4-polyisoprene on being mixed in the conventional mixers shows a fairly strong tendency to degrade. This may cause the viscosity to drop to unacceptably low values. If a rubber producer were to compound a stock of cis 1,4-polyisoprene having improved processability by admixing a suitable additive in a rubber mixer, and if the rubber producer were then to subject this cis 1,4-polyisoprene composition to further conventional mixing processes, this would mean that the polyisoprene would be subjected at least twice to an intensive mixing process. In view of the above-noted sensitivity to degradation of polyisoprene this is unacceptable in practice. The additive should therefore be mixed with the polyisoprene in a manner which obviates the need for an additional mixing step in a mixer. A method which has been found eminently suitable in practice comprises dissolving the additive concerned in the polyisoprene solution and subsequently contacting this solution with an aqueous medium at elevated temperature, such as steam, and separtaing the coagulated rubber mass (preferably in the form of crumbs) which also contains the additive. It will be clear that in connection with this mixing procedure the additive to be used should meet two further requirements: on the one hand it should be soluble in hydrocarbon solvents, on the other it should not evaporate on coming into contact with the aqueous medium at elevated temperature. Moreover, it should be homogeneously incorporated in the coagulated rubber mass.

It has now been found that aliphatic monocarboxylic acids of which the carboxyl group is attached to a tertiary or quaternary carbon atom and which contain at least 15 carbon atoms per molecule meet the complex of requirements outlined above. These acids improve the processability and miscibility of cis 1,4-polyisoprene without impeding the strength properties of the vulcanizate, they can be simply prepared on a commercial scale as pure and stable compounds or mixtures of compounds, yield mixtures with cis 1,4-polyisoprene having high stability on storage, are soluble in the conventional hydrocarbon solvents and do not evaporate when the rubber is coagulated from its solution by means of an aqueous medium at elevated temperature.

The invention therefore relates to a process for the preparation of a cis 1,4-polyisoprene-containing rubber mixture, in which a solution of the polyisoprene in a hydrocarbon solvent, which also contains the special type of organic acid, is contacted with an aqueous medium at elevated temperature sufficient to volatilize the solvent, whereupon an organic acid-containing rubber mass is separated, the organic acid used being a saturated aliphatic monocarboxylic acid or a mixture of such acids, the carboxyl group of which is attached to a tertiary or quaternary carbon atom and which contains 15-24 carbon atoms per molecule.

Preferably aliphatic carboxylic acids are used which contain 15 to 19 carbon atoms per molecule. Specifically suitable for use in the process according to the invention are monocarboxylic acids which correspond to general formula:

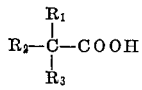

wherein $R_1$ and $R_2$ are alkyl, aryl or aralkyl groups having 1-8 carbon atoms each and $R_3$ is one of these groups or hydrogen. These and similar acids used according to the invention can be prepared by reacting mono-olefins with formic acid or with carbon monoxide and water, in the presence of a mineral acid catalyst. Although it is in principle possible to start from any mono-olefin having at least 14 carbon atoms in order to obtain carboxylic acids having at least 15 carbon atoms, it is preferred to use olefins obtained by cracking paraffinic hydrocarbons, such as solid paraffin wax, distillation residues of mineral oil and heavy fractions of catalytically cracked mineral oil. These paraffinic hydrocarbons are preferably cracked in the vapor phase, in the presence of steam.

The cis 1,4-polyisoprene present in the rubber mixtures prepared according to the invention contains at least 80% cis 1,4-configuration, and preferably 85–100% thereof and has an intrinsic viscosity of 4–14 dl./g. It is obtained by polymerization of isoprene in a hydrocarbon solvent in the presence of a suitable Ziegler catalyst, such as titanium tetrachloride and an organic-aluminum compound or of a lithium-based catalyst, such as an alkyl lithium compound. In principle a suitable solvent may be any hydrocarbon which at normal conditions of temperature and pressure is liquid, such as isopentane, hexane, benzene, toluene and amylenes which are formed in considerable quantities in the dehydrogenation of $C_5$-hydrocarbons to isoprene in addition to this diolefin. As a result of this solution polymerization the cis 1,4-polyisoprene formed is obtained as a solution in the liquid hydrocarbon. In the process according to the invention the special class of aliphatic monocarboxylic acids can now very suitably be added to the cis 1,4-polyisoprene solution otbained in the solution polymerization of isoprene. This addition is effected in quantities of, in general, not more than 10 parts by weight per 100 parts by weight of rubber, preferably in quantities of 0.5 to 5 parts by weight and optimally 1.5 to 3 parts by weight. The solution thus otbained, which consequently contains both the cis 1,4-polyisoprene and the organic acid, is subsequently contacted with an aqueous medium at elevated temperature, preferably steam.

It will be understood that in this case the temperature of the aqueous medium is above the boiling point of the hydrocarbon solvent of the cis 1,4-polyisoprene solution. As a result the hydrocarbon is evaporated and can be recovered, if desired. The cis 1,4-polyisoprene is coagulated by the aqueous medium and is obtained as a crumbly mass which contains the carboxylic acid homogeneously dispersed in the polyisoprene. This rubber mass is subsequently separated from the aqueous coagulant and, after drying, yields a cis 1,4-polyisoprene composition having improved processability and miscibility. As a result, this grade of isoprene rubber is extremely suitable for the ready compounding of rubber mixtures by mixing this rubber in a rubber mixer with one or more other synthetic rubbers and/or natural rubber, as well as with the conventional rubber additives to form the desired rubber mixture.

By means of moulding and vulcanization, the resulting rubber mixtures can be processed into articles such as tires, driving belts, hoses, tubes, insulating material, shock absorbers, etc.

EXAMPLE I

With respect to a large number of surface-active substances, the effect on the processability of cis 1,4-polyisoprene was investigated in the following manner. The criterion applied for the processability was the rate of incorporation of carbon black into the rubber, measured on the basis of so-called "black incorporation time" (BIT), determined by means of the Brabender plastograph. This apparatus is essentially a small closed kneader for use on a laboratory scale. It was used in the following standard test:

A quantity of 47 g. of cis 1,4-polyisoprene having a cis 1,4-content of 92% and an I.V. of 8 dl./g., measured in toluene at 25° C., was mixed for one minute with 3 phr. (= parts by weight per 100 parts by weight of rubber) of the relevant surface-active substance. Subsequently, 23.5 g. of HAF black (i.e., corresponding to 50 phr.) were admixed. The time elapsing between the moment of addition of the black and the moment when the maximum torque of the kneader arms is reached, which time corresponding to a good dispersion of black in rubber, is the "black incorporation time" or BIT. The shorter the BIT which is measured, the more effectively the processability of the rubber is improved by the relevant additive. A description of this method of measuring the processability of rubbers can be found in an article by A. Meder and W. May in "Rubber Journal," June 1964, pp. 39–43.

The surface-active substances examined appeared to fall into 3 groups: a group which reduced the BIT, a group which had no real effect on the BIT and a group which extended the BIT. The following table summarizes the data obtained:

maining additives which improved the processability. Disproportionated rosin, which effected a marked reduc-

TABLE I

| Additive | BIT in min. | Additive | BIT in min. |
|---|---|---|---|
| None (blank) | 23 | | |
| Stearic acid | 12 | Stearyl alcohol | 26 |
| Stearyl amide | 8 | Chlorinated paraffin wax | 40 |
| Condensation product of glycerol and propylene oxide | 14 | Dimerized fatty acid amides | 43 |
| Oleic acid | 16 | | |
| Disproportionated rosin acid | 17 | Dimer of oleic acid | 16 |
| $C_{9-11}$ branched carboxylic acids | 15 | Glycerol monostearate | 23 |
| $C_{15}$-$C_{19}$ branched carboxylic acids [1] | 15 | | |

[1] Both are mixtures of branched monocarboxylic acids which are prepared from $C_8$-$C_{10}$ and $C_{14}$-$C_{18}$ olefin fractions respectively, as follows.

The relevant olefin fraction was reacted with carbon monoxide and water at a temperature of 80° C. and a carbon monoxide pressure of 100 atm., in the presence of a complex of an equimolecular quantity of phosphoric acid and boron trifluoride as catalyst. The crude carboxylic acids were separated off and purified by neutralization with sodium hydroxide, separation of the sodium salts, acidification with mineral acid and distillation in vacuo. The resulting acids were mixtures of branched monocarboxylic acids having 9 to 11 and 15 to 19 carbon atoms in the molecule respectively, of which the carboxyl groups are attached to tertiary and quaternary carbon atoms.

The additives which reduced the BIT were subsequently examined to ascertain whether they met the two requirements made on the preparation of mixtures of rubber and additives from a hydrocarbon solution by coagulation with, for example, steam, these requirements being solubility in the hydrocarbon solvent and non-volatility with the coagulant at elevated temperature.

Of the surface-active substances which improved the processability, stearyl amide was found to be insoluble in hydrocarbon solvents and $C_{9-11}$ branched carboxylic acids were found to evaporate with the coagulant at elevated temperature. Consequently, these compounds proved to be unsuitable for the purposes of the invention.

The remaining additives which improved the processability were examined to ascertain whether they met the requirement of a reasonable storage stability of the relevant rubber mixture. On storage both the stearic acid and glycerol-propylene oxide condensate appeared to separate ("sweating"); stearic acid was subsequently found to crystallize. On the other hand, although not separating, oleic acid was found to promote the degradation of the rubber. Consequently, these compounds proved to be unsuitable as rubber additives in view of the inadequate storage stability of the resulting rubber mixture.

The following was established with respect to the retion of the BIT, appeared unable to improve the miscibility of cis 1,4-polyisoprene with natural rubber. This was established in the following mixing test: cis 1,4-polyisoprene with no additive as blank and cis 1,4-polyisoprene with 3 phr. of the rosin were mixed one after another in a Banbury mixer with natural rubber in a ratio of 70 parts by weight of cis 1,4-polyisoprene and 30 parts by weight of natural rubber. In both mixing tests the mixing time was 1½ minutes. The miscibility was determined visually from the homogeneity of the resulting rubber mixture. This is a suitable criterion since natural rubber is a dark-brown product and cis 1,4-polyisoprene a transparent product. Whether non-dispersed fragments of cis 1,4-polyisoprene are present can be seen at once from bright patches in a brown sheet of rubber formed from the rubber mass in the Banbury. Both when the mixing of cis 1,4-polyisoprene with natural rubber was carried out without additive or when it was effected with 3 phr. of disproportionated rosin, the sheet formed from the resulting mixture was found to contain a number of non-dispersed fragments of cis 1,4-polyisoprene. Thus it was established visually that the use of the rosin had not demonstrably improved the miscibility of cis 1,4-polyisoprene with natural rubber.

Although dimer acid was found to improve the processability both with black and with natural rubber, this was accompanied by an impermissible decrease of the tensile strength of the vulcanizate, as appears from the following results determined from optimally vulcanized rubber mixtures.

TABLE II

Cis 1,4-polyisoprene Tensile strength kg./cm.²
Without additive _____ 260
With 3 phr. of dimer acid _____ 190
Without additive+50 phr. of HAF _____ 270
With 3 phr. of dimer acid+50 phr. of HAF ____ 235

For ease of reference the above is summarized in the following table.

TABLE III

| Additives having a positive effect on BIT (23 min.) | Requirements for preparation | Storage stability | Other product properties |
|---|---|---|---|
| Stearic acid | m | Sweats | |
| Stearyl amide | Insoluble in hydrocarbon solvent | | |
| Glycerol condensate | m | Sweats | |
| Oleic acid | m | Promotes degradation of rubber | |
| Disproportionated rosin | m | m | No improved miscibility with natural rubber. |
| $C_{9-11}$ branched acids | Volatile | | |
| $C_{15}$-$C_{19}$ branched carboxylic acids | m | m | m. |
| Dimer acid | m | m | Reduced tensile strength. |

The letter $m$ means that the relevant additive meets the requirement pertaining to the column in question. Thus stearic acid meets the preparative requirements of solubility in the hydrocarbon solvent and of non-volatility, but not the requirement of storage stability. For this reason no further attention has been paid to the other product properties and the last column is therefore left blank.

The table shows that the only additive which has completely satisfactory properties is the mixture of $C_{15}$–$C_{19}$ branched carboxylic acids answering the definition of the present invention.

EXAMPLE II

The processing properties of cis 1,4-polyisoprene mixtures which contained 1.5, 2.25 and 3 phr. respectively of $C_{15}$–$C_{19}$ branched carboxylic acids were determined and compared with mixtures which contained 25 phr. of a naphthenic rubber extending oil. Further, with reference to optimally vulcanized rubber mixtures the tensile strength was determined of the unfilled vulcanizate and of vulcanizate filled with 50 phr. of HAF-black.

The mixtures were invariably prepared as follows:

The starting material was a solution of cis 1,4-polyisoprene having a cis 1,4-content of 92% and an I.V. of 8 dl./g., measured in toluene at 25° C., using isopentane as solvent. The solution contained 17% by weight of cis 1,4-polyisoprene based on the total solution. The relevant additive (1.5, 2.25 or 3) phr. of $C_{15}$–$C_{19}$ branched carboxylic acids or 25 phr. of oil was added to this solution and thoroughly mixed with the cis 1,4-polyisoprene, with stirring. The solution thus prepared was subsequently contacted with steam at 180° C. and 2.5 atm. This caused the isopentane to evaporate and the dissolved rubber to coagulate to a rubber crumb consisting of cis 1,4-polyisoprene, which contained the relevant additive in a homogeneously dispersed state. The rubber crumb was separated off and dried, and the resulting rubber mixture was subsequently examined as to its properties.

The properties of the mixtures obtained are summarized in the following table.

TABLE IV

| Mixing characteristics | IR [1] | IR [1] with 1.5 phr. | 2.25 phr. | 3 phr. | IR [1] With 25 phr. of oil |
|---|---|---|---|---|---|
| | | of $C_{15}$–$C_{19}$ branched carboxylic acids | | | |
| (1) With black (BIT in min.) | 23 | 15 | 14 | 12 | 18 |
| (2) With natural rubber [2] (visually after mixing for 1½ minutes) | ([3]) | ([4]) | ([4]) | ([4]) | ([4]) |
| Properties of vulcanizate, tensile strength kg./cm.[2]: | | | | | |
| Unfilled | 260 | 280 | 270 | 265 | 180 |
| With 50 phr. of HAF | 270 | 275 | 280 | 275 | 225 |

[1] IR = cis 1,4-polyisoprene.
[2] 70% by weight of cis 1,4-polyisoprene and 30% by weight of natural rubber.
[3] Many nondispersed fragments; crumbly.
[4] Homogeneous and coherent.

Table IV shows that although naphthenic extending oil is capable of improving the processability of cis 1,4-polyisoprene, the tensile strength of the vulcanizate is sacrificed thereby. The use of an additive according to the invention ($C_{15}$–$C_{19}$ branched carboxylic acids) results in an improvement of the processability which, judging from the BIT, is even more pronounced than when use is made of an extending oil, with the tensile strength of the vulcanizate being fully maintained.

We claim as our invention:

1. A rubber composition comprising:
   (a) 100 parts by weight of a high cis 1,4-polyisoprene; and
   (b) 0.5–10 parts by weight of at least one monocarboxylic acid containing 15–24 carbon atoms per molecule and having the general configuration:

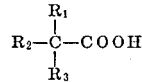

wherein $R_1$ and $R_2$ are hydrocarbyl radicals having 1–8 carbon atoms each, and $R_3$ is a radical of the group consisting of hydrogen and hydrocarbyl radicals having 1–8 carbon atoms.

2. A composition according to claim 1 wherein the polyisoprene has a cis 1,4-content of at least 85% and the acid is at least one alpha,alpha-dialkyl monocarboxylic acid having 15–19 carbon atoms per molecule.

3. A composition according to claim 2 wherein the acid is present in an amount between 0.5 and 5 parts by weight.

References Cited

UNITED STATES PATENTS 3,031,424   4/1962   Holmes et al. _____ 260—23.7
3,088,839   5/1963   Antonsen et al. _____ 260—414

DONALD E. CZAJA, Primary Examiner

D. J. BARRACK, Assistant Examiner

U.S. Cl. X.R.

260—23.7, 27, 28.5, 31.6, 32.6, 33.2, 33.4, 41.5, 94.7